(No Model.)
W. W. BEACH.
INSULATOR FOR ELECTRIC WIRES.
No. 294,563. Patented Mar. 4, 1884.
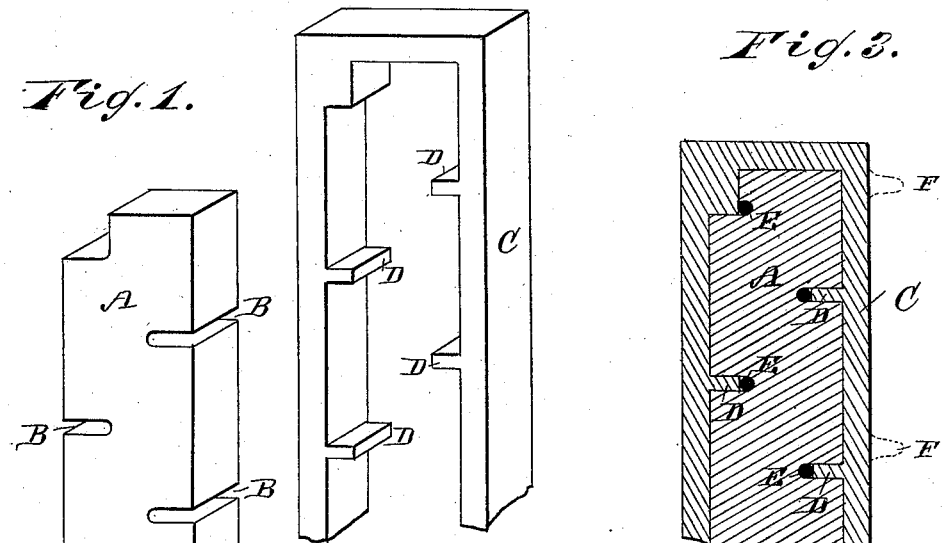
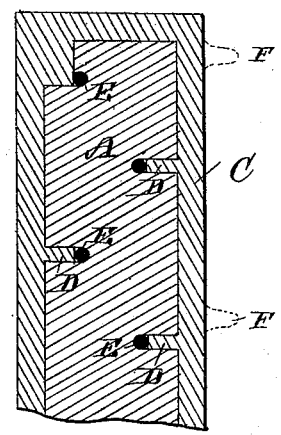
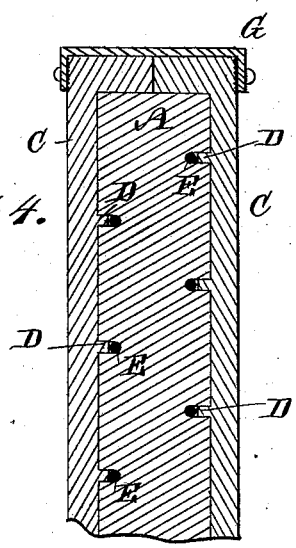
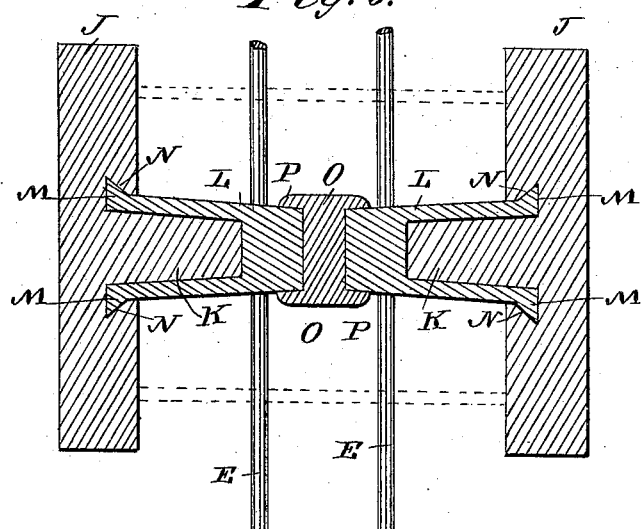
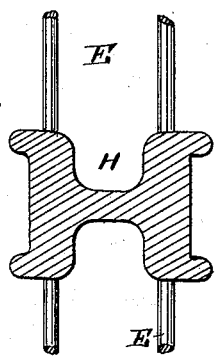
WITNESSES:
INVENTOR:
W. W. Beach
BY Munn & Co
ATTORNEYS.
N. PETERS, Photo-Lithographer, Washington, D. C.

UNITED STATES PATENT OFFICE.

WILLIAM W. BEACH, OF NEW YORK, N. Y.

INSULATOR FOR ELECTRIC WIRES.

SPECIFICATION forming part of Letters Patent No. 294,563, dated March 4, 1884.

Application filed June 27, 1883. (No model.)

*To all whom it may concern:*

Be it known that I, WILLIAM W. BEACH, of the city, county, and State of New York, have invented a new and Improved Insulator for Electric Wires, of which the following is a full, clear, and exact description.

The object of my invention is to provide a new and improved insulator for electric wires, in which insulator a series of wires can be held.

The invention consists in a block provided with transverse grooves for receiving the wires, and with a frame having tongues fitting in said grooves, which frame can be passed over the block provided with the grooves.

The invention also consists in various parts and details and combinations of the same, as will be fully set forth and described hereinafter.

Reference is to be had to the accompanying drawings, forming part of this specification, in which similar letters of reference indicate corresponding parts in all the figures.

Figure 1 is a perspective view of the inner block of my improved insulator for electric wires. Fig. 2 is a perspective view of the outer casing. Fig. 3 is a longitudinal sectional elevation of the block in the casing. Fig. 4 is a longitudinal sectional elevation of a modification of the same. Figs. 5 and 6 are cross-sectional elevations of other modifications of the same.

A block, A, of glass, rubber, or other suitable insulating material is provided in its side edges with a series of transverse grooves, B, so arranged that the grooves on the opposite sides will not be in the same transverse planes. A casing or frame, C, also made of glass or other suitable insulating material, is provided on its inner surface with a series of tongues, D, arranged to fit within the grooves in the block A. The difference between the lengths of the tongues and the depths of the corresponding grooves is such that when the tongues are on the grooves transverse openings will be formed through which the wires E can be passed. The wires are first passed through the frame C and then passed into the grooves B in the block A, and the frame C is then slipped over the block A from the side in such a manner that the tongues D pass into the grooves B, and thus close them, thereby holding the wires in the inner parts of the grooves. The insulator is then held to the side of a pole or other support, or the insulator can also be used for underground or other lines. If desired, the frame C can be provided on the outer surface with longitudinal or transverse tongues F, or with projections to hold the surface of the frame a certain distance from the pole or other support. If desired, the frame C can be made in two sections, held together and to the block A by rings or caps G, screwed on the ends. In place of the grooved block and tongued frame, a block, H, Fig. 6, may be used, which is provided with transverse apertures for the wires E, as shown in Fig. 1.

In the modification shown in Fig. 5 two strips of wood, J, are provided along the middle of the facing longitudinal surfaces with a ridge, K, at each side of the base of which ridge a dovetailed or undercut groove, N, is cut in the surface of the strips. Hollow glass strips L are provided along the edges at the open side with dovetailed tongues M, which are passed into the grooves N, so that the ridges K will be within the hollow strips L of glass, the dovetailed tongues holding the glass strips L in place on the wooden strips J and on the ridges on the same. The glass strips L are provided in the edges facing each other with transverse grooves for the wires, and between the said wooden strips J a block, O, of glass is passed, which is provided with tongues P, fitting in the grooves for receiving the wires in the manner set forth above. The block O is passed in between the strips L from the sides. Bolts are passed through the wooden strips J, as indicated in dotted lines in Fig. 5, or wires can be passed around the two strips J for the purpose of holding the parts together. One of the strips J is then secured to a pole or other support. It is evident that the frame can be provided with the grooves and the block with the tongues.

By means of my improved insulator a number of wires can be held on a pole in a small space, the pole is not defaced, and the unsightly arms used at present can be dispensed with. The wires are held very securely and cannot drop out.

Having thus described my invention, what I claim as new, and desire to secure by Letters Patent, is—

1. An insulator for electric wires, consisting of an insulating-block having grooves to receive the wires and a tongued piece for holding the wires in the grooves, substantially as herein shown and described.

2. An insulator for electric wires, consisting of an insulating-block, provided with a series of grooves for receiving the wires, and of a frame adapted to surround the block and provided with a series of tongues for partly filling the grooves, substantially as herein shown and described.

3. In an insulator for electric wires, the combination, with a block having transverse grooves for receiving the wires, an outer frame formed of two strips provided with tongues fitting in the said grooves, and of devices for holding the ends of the strips together and on the block, substantially as herein shown and described.

4. In an insulator for electric wires, the combination, with the block O, having tongues P, of the transversely-grooved glass strips L, and of wooden strips J, on which the glass strips L are held, substantially as herein shown and described.

5. In an insulator, the combination, with the block O, having tongues P, of the hollow glass strips L, having dovetailed flanges M, and of the wooden strips J, having tongues K and dovetailed grooves N, substantially as herein shown and described.

WM. W. BEACH.

Witnesses:
E. M. CLARK,
C. SEDGWICK.